United States Patent
Roy et al.

(10) Patent No.: US 11,012,955 B2
(45) Date of Patent: May 18, 2021

(54) SYNCHRONIZATION OF HOST AND CLIENT LOG TIMESTAMPS

(71) Applicant: International Business Machines Corporation, Armonk, NY (US)

(72) Inventors: Subhojit Roy, Pune (IN); Frank Krick, Ockenheim (DE); Tej Parkash, Pune (IN); Lokesh Arora, Pune (IN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 15/926,330

(22) Filed: Mar. 20, 2018

(65) Prior Publication Data

US 2019/0297588 A1 Sep. 26, 2019

(51) Int. Cl.
*G06F 16/27* (2019.01)
*H04W 56/00* (2009.01)
*H04L 12/26* (2006.01)
*H04L 29/08* (2006.01)

(52) U.S. Cl.
CPC .......... *H04W 56/001* (2013.01); *G06F 16/27* (2019.01); *H04L 43/106* (2013.01); *H04L 67/1095* (2013.01)

(58) Field of Classification Search
CPC ............. H04W 56/001; H04L 67/1095; H04L 43/106; G06F 17/30575
USPC ......................................................... 707/610
See application file for complete search history.

(56) References Cited

U.S. PATENT DOCUMENTS

| 6,351,821 | B1 * | 2/2002 | Voth | G06F 1/14 |
| | | | | 709/248 |
| 6,581,110 | B1 * | 6/2003 | Harif | H04L 29/06 |
| | | | | 709/248 |
| 7,546,384 | B1 * | 6/2009 | Chatt | H04L 67/06 |
| | | | | 709/248 |
| 8,719,452 | B1 * | 5/2014 | Ding | H04N 21/4344 |
| | | | | 709/248 |
| 10,019,501 | B2 * | 7/2018 | Zondervan | G06F 16/275 |
| 2003/0014464 | A1 * | 1/2003 | Deverill | G06F 11/3495 |
| | | | | 718/101 |

(Continued)

FOREIGN PATENT DOCUMENTS

WO 2010/039626 A3 4/2010

OTHER PUBLICATIONS

Seagate,"SCSI Commands Reference Manual", Rev. C, Apr. 2010, pp. 1-446.

(Continued)

*Primary Examiner* — Mohammad S Rostami
*Assistant Examiner* — Robert F May
(74) *Attorney, Agent, or Firm* — Kunzler Bean & Adamson (57) ABSTRACT

Systems for synchronization of host and client log timestamps are provided. One system includes a timing module that acquires an initiator timestamp, wherein the initiator timestamp indicates a time on an initiating device associated with a computational activity performed between the initiating device and a receiving device. Additionally, the system includes a communication module that transmits the initiator timestamp to the receiving device. Also, the system includes a synchronization module that associates a receiver record of the computational activity on the receiving device with the initiator timestamp.

20 Claims, 7 Drawing Sheets

(56) References Cited

U.S. PATENT DOCUMENTS

| | | | |
|---|---|---|---|
| 2003/0117899 A1* | 6/2003 | Eidson | G06F 1/12 |
| | | | 368/46 |
| 2005/0138383 A1* | 6/2005 | Vainstein | G06F 21/645 |
| | | | 713/178 |
| 2005/0198452 A1* | 9/2005 | Watanabe | G06F 11/2071 |
| | | | 711/162 |
| 2006/0029016 A1* | 2/2006 | Peles | H04L 69/16 |
| | | | 370/328 |
| 2006/0218206 A1 | 9/2006 | Bourbonnais et al. | |
| 2007/0008179 A1* | 1/2007 | Hedley | G07B 15/06 |
| | | | 340/928 |
| 2008/0298398 A1* | 12/2008 | Eidson | H04J 3/0685 |
| | | | 370/503 |
| 2009/0158075 A1* | 6/2009 | Biberstein | G06F 1/12 |
| | | | 713/375 |
| 2015/0236933 A1 | 8/2015 | Edsall et al. | |
| 2015/0333996 A1 | 11/2015 | Finn | |
| 2017/0212946 A1 | 7/2017 | Griffin et al. | |

OTHER PUBLICATIONS

Michael Banther, HP, "SMC-3 Command table and INQUIRY clean-up", HP Memorandum, Jun. 26, 2007, pp. 1-2.

\* cited by examiner

| Bit\Byte | 7 | 6 | 5 | 4 | 3 | 2 | 1 | 0 |
|---|---|---|---|---|---|---|---|---|
| 0 | \multicolumn{8}{c|}{Operation Code} |
| 1 | \multicolumn{8}{c|}{Reserved} |
| 2 | (MSB) | \multicolumn{7}{c|}{Intiator Timestamp} |
| 13 | (LSB) | | | | | | | |
| 14 | \multicolumn{8}{c|}{Allocation Length} |
| 15 | \multicolumn{8}{c|}{Control} |

| Bit\Byte | 7 | 6 | 5 | 4 | 3 | 2 | 1 | 0 |
|---|---|---|---|---|---|---|---|---|
| 0 | (MSB) Length | \multicolumn{7}{c|}{Timestamp Parameter Data} |
| 1 | (LSB) | \multicolumn{7}{c|}{Reserved} |
| 2 | (MSB) | \multicolumn{7}{c|}{Target Timestamp} |
| 13 | (LSB) | | | | | | | |
| 14 | \multicolumn{8}{c|}{Reserved} |
| 15 | \multicolumn{8}{c|}{Reserved} |

302 — Nov 3 19:26:54 localhost libfw[2906]: [LIBFW INFO] ln2_write_attribute.c:DCP_Read_Attribute_Command_Completion:349 Failed Read Attribute Command for Drive : F2, C2, R1 Nov 3 19:26:54 localhost libfw[2906]: [LIBFW INFO] ln2_write_attribute.c:DCP_Read_Attribute_Command_Completion:352 SK : 5 Nov 3 19:26:54 localhost libfw[2906]: [LIBFW INFO] ln2_write_attribute.c:DCP_Read_Attribute_Command_Completion:353 ASCASCQ: 2400

304 — Nov 3 15:26:12 remote-host Nov 3 19:26:54 localhost libfw[2906]: [LIBFW INFO] ln2_write_attribute.c:DCP_Read_Attribute_Command_Completion:349 Failed Read Attribute Command for Drive : F2, C2, R1 Nov 3 15:26:12 remote-host Nov 3 19:26:54 localhost libfw[2906]: [LIBFW INFO] ln2_write_attribute.c:DCP_Read_Attribute_Command_Completion:352 SK : 5 Nov 3 15:26:12 remote-host Nov 3 19:26:54 localhost libfw[2906]: [LIBFW INFO] ln2_write_attribute.c:DCP_Read_Attribute_Command_Completion:353 ASCASCQ: 2400

306 — Date/Time localhost   Date/Time remote-host     Message
--------
11/03/2016 15:26:12       11/03/2016 19:26:54  ANR8302E I/O error on drive DRIVE1 (/dev/rmt1)with volume V12345L3 (OP=WRITE, Error Number=5, CC=0, KEY=4D, ASC=24, ASCQ=00, SENSE=F0.00.4D.00.04.00.00.58.00.00.00.00.00.00.00.00.01.56.30.33.35.31.31.20.00.00.00.0 0.00.00.00.00.00.00.00.00.00.00.00.00.00.00.00.00.00.00.00.00.00.00.00.00.00.00.00.00.0 0.00.00.00.00.00.00.00.00.00.00.00.00.00.00.00.00.00.00.00.00.00.00.00,Description=An undetermined error has occurred). Refer to Appendix C in the 'Messages' manual for recommended action.

FIG. 3

| Index | Host | Timestamp | Time Difference |
|---|---|---|---|
| 1 | Initiator 1 | T1 | Target Time – T1 |
| 2 | Initiator 2 | T2 | Target Time – T2 |

400

402  404  406  408

| Index | Host | Timestamp | Time Difference |
|---|---|---|---|
| 1 | Receiver 1 | T1 | Initiator Time – T1 |
| 2 | Receiver 2 | T2 | Initiator Time – T2 |

SYNCHRONIZATION OF HOST AND CLIENT LOG TIMESTAMPS

FIELD

This invention relates to time synchronization for different devices and more particularly relates to methods and systems for synchronization of host and client log timestamps.

BACKGROUND

Timestamp differences between host devices and target devices in storage area networks may cause debugging issues because the timestamps for the host devices do not match the timestamps for the target devices. Further, the size and complexity of storage area networks along with the speed that technology changes increases the challenge of defining a common timestamp between host devices and target devices.

SUMMARY

Methods and systems for synchronization of host and client log timestamps are provided. A system includes a timing module that acquires an initiator timestamp for a computational activity performed between an initiating device and a receiving device, wherein the initiator timestamp indicates a time on the initiating device associated with the computational activity. The system also includes a communication module that transmits the initiator timestamp to the receiving device. The system further includes a synchronization module that associates the receiver record of the computational activity on the receiving device with the initiator timestamp.

One method includes generating an initiator timestamp for an initiating device where the initiator timestamp indicates the time of the initiating device associated with a computational activity. The method also includes transmitting a timestamp report request to a receiving device by the initiating device the timestamp report request including the initiator timestamp. Further, the method includes transmitting a receiver timestamp in response to the timestamp report request. Also, the method includes associating the initiator timestamp with the receiving record on the receiving device and the receiver timestamp within an initiator record on the initiating device.

Also disclosed are computer program products comprising a computer-readable storage medium including program instructions embodied therewith for generating an initiator timestamp at an initiating device, wherein the initiator timestamp indicates a time on the initiating device associated with the computational activity. Some program instructions executable by a processor cause the processor to transmit a timestamp report request to the receiving device by the initiating device, the timestamp report request including the initiator timestamp. Further, the program instructions cause the processor to transmit a receiver timestamp in response to the timestamp report request. Also, the program instructions cause the processor to associate the initiator timestamp with the receiving record on the receiving device and a receiver timestamp with an initiator record on the initiating device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a diagram illustrating embodiments of records maintained on a host device and a target device;

DETAILED DESCRIPTION

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

A method for synchronization of host and client log timestamps may include generating an initiator timestamp at an initiating device, wherein the initiator timestamp indicates a time on the initiating device associated with the computational activity. The method further may include transmitting the initiator timestamp to a receiving device by the initiating device. The method may further include associating the initiator timestamp with a receiver record on the receiving device.

In some embodiments, transmitting the initiator timestamp comprises transmitting a timestamp report request to the receiving device. In certain embodiments, transmitting the timestamp report request may include inserting the initiator timestamp into a SCSI report timestamp command. In further embodiments, transmitting the timestamp report request may include relaying the timestamp report request through a switch. Also, in certain embodiments, the method may include inserting a switch timestamp into the timestamp report request.

In various embodiments, the method may include updating a timestamp table on a receiving device, wherein the timestamp table indicates the difference between the initiator timestamp and an associated time on the receiving device. In further embodiments, the timestamp table may indicate that difference between a second initiator timestamp and a second associated time on the receiving device, wherein the second initiator timestamp is transmitted to the receiving device for the second initiator.

A system for synchronization of host and client log timestamps may include a timing module that acquires an initiator timestamp for a computational activity performed between an initiating device and a receiving device, wherein the initiator timestamp indicates a time on the initiating device associated with computational activity. In a further embodiment, the system may include a communication module that transmits the initiator timestamp to a receiving device. In an additional embodiment, the system may include a synchronization module that associates a receiver record of a computational activity on a receiving device with an initiator timestamp.

In some embodiments, a timing module may acquire a receiver timestamp for a computational activity, wherein the receiver timestamp indicates a time on a receiving device associated with the computational activity. In further embodiments, a communication module may transmit a receiver timestamp to an initiating device. Additionally, a synchronization module may associate an initiator record of a computational activity on an initiating device with a receiver timestamp.

In at least one embodiment, a communication module may generate a command to transmit an initiator timestamp to a receiving device. In a further embodiment, a communication module may insert an initiator timestamp in a timestamp report request, wherein the timestamp report request is a request to the receiving device to provide a timestamp report. In an additional embodiment, a communication module may transmit an initiator timestamp to a switch, wherein the switch relays the initiator timestamp to a receiving device. In certain embodiments, a switch appends a switch timestamp to an initiator timestamp and a synchronization module associates the switch timestamp with a receiver record of a computational activity.

In certain embodiments, a system may include an analysis module, wherein the analysis module maintains a timestamp table on a receiving device, wherein the timestamp table indicates the difference between an initiator timestamp and an associated time on the receiving device. In a further embodiment, the timestamp table may indicate a second difference between a second initiator timestamp and a second associated time on a receiving device, wherein the second initiative timestamp is transmitted to the receiving device from a second initiating device.

Also disclosed are computer program products comprising a computer-readable storage medium including program instructions embodied therewith that can generate an initiator timestamp at an initiating device, wherein the initiator timestamp indicates a time on the initiating device associated with the computational activity. Some program instructions are executable by a processor and cause the processor to transmit the initiator timestamp to a receiving device by an initiating device. Additional program instructions are executable by a processor and cause the processor to associate the initiator timestamp with a receiver record on the receiving device.

In some embodiments, the program instructions further cause the processor to insert an initiator timestamp him a difference between an initiator timestamp and an associated time on the receiving device.

The description of elements in each figure below may refer to elements of proceeding Figures. For instance, like numbers can refer to similar elements in all figures, including alternate embodiments of similar elements.

Figure 1:
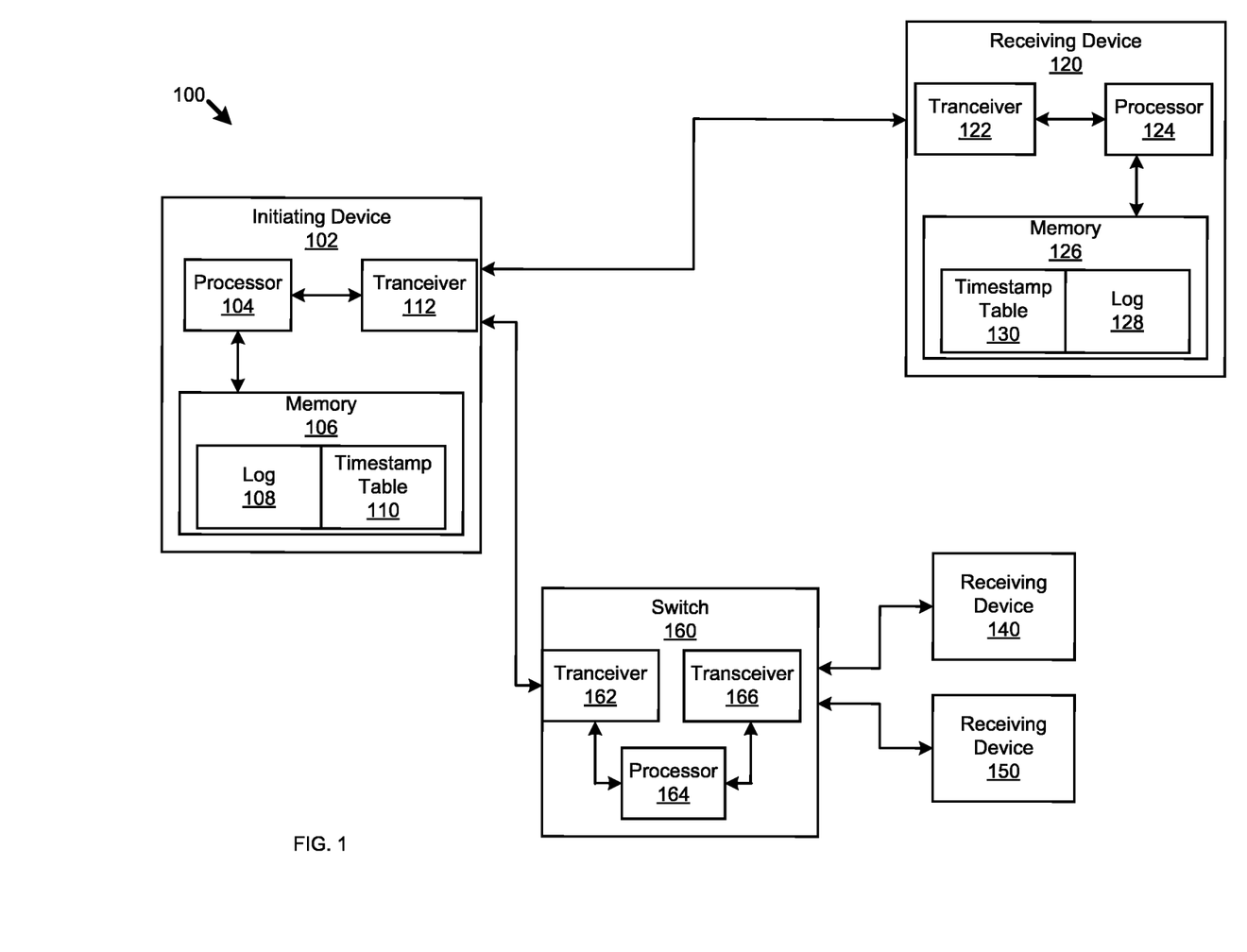
FIG. 1 is a block diagram illustrating one embodiment of a network.

With reference now to the figures, FIG. 1 is a block diagram illustrating one embodiment of a network 100, where information is transmitted between different nodes in the network 100. As described herein, a network 100 may describe multiple devices, where data is transmitted between the devices, where a device may be a node in the network 100. For example, the network 100 may connect an initiating device 102 with one or more receiving devices, such as receiving device 120, receiving device 140, and/or receiving device 150. The initiating device 102 may be connected to other receiving devices not shown. Also, a receiving device, such as receiving device 120, 140, or 150, may be connected to other initiating devices other than the initiating device 102. Further, in the network 100, a host device may communicate with one or more node devices. As illustrated, the initiating device 102 may function as a host device and the receiving devices 120, 140, and 150 may function as node devices in communication with the host device. Alternatively, the initiating device 102 may function as a node device and the receiving devices 120, 140, and 150 may function as separate host devices.

In at least one embodiment, the network 100 may be a storage area network, a personal area network, a local area network, a wide area network, and the like. In certain embodiments, when the network 100 is a storage area network, a storage area network may be a high-speed, special-purpose network that interconnects storage devices with associated data servers. As shown, the initiating device 102 may function as a data server and the receiving devices 120, 140, 150 may function as storage devices. Further, in the network 100, a host device may communicate with one or more node devices. As illustrated, the initiating device 102 may function as a host device and the receiving devices 120, 140, and 150 may function as node devices in communication with the host device. Alternatively, the initiating device 102 may function as a node device and the receiving devices 120, 140, and 150 may function as separate host devices.

In certain embodiments, the initiating device 102 may include a processor 104. As used herein, a processor 104 may be a general purpose computer, special purpose computer, or other programmable data processing apparatus. The processor 104 may execute computer readable program instructions associated with generating timestamps, communicating the timestamps with other devices in the network 100, and recording timestamps received from other devices in the network 100. In at least one embodiment, the processor 104 may control communications through a transceiver 112 with the various receiving devices 120, 140, and 150 in communication with the initiating device 102. In at least one embodiment, the processor 104 communicates data, such as timestamps, with the receiving devices 120, 140, and 150 through the transceiver 112.

In certain embodiments, when the initiating device 102 communicates with the receiving devices 120, 140, and 150 through the transceiver 112, the processor 104 may execute computer-readable program instructions that cause the processor 104 to store data on a memory 106. As used herein, a memory 106 may be any suitable type of storage device that is known or developed in the future that can store computer-usable data. In various embodiments, a memory 106 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with the computer processing device such as processor 104.

In certain embodiments, a memory 106 may be implemented as a direct-access storage device (DASD). A memory 106, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A memory device 106, in various embodiments, may include non-volatile/persistent hardware and/or software configured to perform long-term data storage operations, including, but not limited to, data archiving, data backup, data mirroring, replicating data, etc. For instance, a memory 106 may include non-volatile and/or persistent hardware and/or software to perform long-term data storage operations, which may include write operations, read operations, read-write operations, etc., among other operations.

In some embodiments, a memory 106 stores objects (e.g., data, executable programs, source program libraries, etc.). In at least one embodiment, the memory 106 stores a record of computational events that occur on the initiating device 102. In at least one embodiment, the record may be a log 108. A log 108, as described herein may refer to a detailed list of application information, system performance, or user activities. In certain embodiments, the log 108 maintains information regarding communications between different devices in the network 100. For example, when information is transmitted between separate devices, the information may be stored in the log 108. In certain embodiments, when information is stored in the log, the information may be marked with an associated timestamp. As used herein, the timestamp may be information indicating the time of occurrence for a particular event associated with the information. For example, the timestamp may indicate when a message is transmitted between two devices, when a message was received, when information is stored on the memory 106, when information is generated, and the like. Timestamps may be helpful in performing debugging operations associated with the communications between separate devices in the network 100.

In at least one embodiment, an event may occur between multiple devices in the network 100. For example, an event may occur between an initiating device 102 and a receiving device 120. When this event occurs, a processor 104 associated with the initiating device may store a record of the event in the log 108. As part of storing the record of the event in the log 108, the processor 104 may also store a timestamp associated with the event. As illustrated, the receiving device 120 may include a processor 124 that is substantially similar to processor 104. Also, the receiving device 120 may include a memory 126 that is substantially similar to memory 106. Accordingly, the processor 124 on the receiving device 120 may also store a record of the event that occurs between the initiating device 102 and the receiving device 120.

In at least one embodiment, the initiating device 102 may be a SCSI initiating device and the receiving device 120 may be a SCSI target device. When the initiating device 102 is a SCSI initiating device, the initiating device 102 may be a SCSI device containing application clients executed by the processor 104 and SCSI initiator ports as part of transceiver 112 that originate device service and taskmaster request to be processed by a SCSI target device such as the processor 124 on the receiving device 120 and receive device service and task management responses from the SCSI target device. As described herein, when the receiving device 120 is a SCSI receiving device, the receiving device 120 may contain logical units executed by the processor 124 and SCSI target ports as part of the transceiver 122 that receive device service and taskmaster requests for processing and sends device service and test management responses to a SCSI initiating device. Further, at least one embodiment, the SCSI ports of the transceivers 112 and 122 may be ports to connect the application client, device server or test measure to the service delivery subsystem, where the service delivery subsystem is a part of the SCSI input/output system that transmits service request to a logical unit or SCSI target device, such as the receiving device 120, and returns logical unit or SCSI target device responses to a SCSI initiating device, such as the initiating device 102.

In certain embodiments, the processor 104 may generate a timestamp and associate the timestamp with the event in log 108 and store the timestamp in association with the event stored in the log 108. Also, the processor 124 may generate a timestamp and associate the timestamp with the event in log 128 and store the timestamp in association with the event stored in the log 128. In at least one embodiment, the event stored in the log 128 and the event stored in the log 108 may be the same event. However, the timestamps generated by the processor 104 and the processor 124 in association with the same event may be different. This difference in timestamps may increase the difficulty of debugging or providing maintenance for the network 100.

In at least one embodiment, the processor 104 and the processor 124 may synchronize the timestamps that are recorded in the respective logs 108 and 128. To synchronize the timestamps as recorded and the respective logs 108 and 128, one of the processors 104 and 124 may transmit a request for a timestamp to the other device and append a timestamp of the transmitting device to the request for a timestamp. For example, an initiating device 102 may transmit a timestamp report request to the receiving device 120. In the timestamp report request, the initiating device 102 may append the timestamp of the initiating device 102 into the timestamp report request to the receiving device 120.

In certain embodiments, in response to receiving a timestamp report request, a device in the network 100 may identify the timestamp from the transmitting device in the timestamp report request and attach the timestamp to an associated entry in a record, such as a log, of the receiving device. For example, the receiving device 120 may receive a timestamp report request from the initiating device 102. As described above, the timestamp report request sent from the initiating device 102 may include an appended initiator timestamp for the initiating device 102. Upon receiving the timestamp report request with the appended initiator timestamp, the processor 124 may extract the initiator timestamp from the timestamp report request and appended to a record of an event in the memory 126. For example, the processor may append the timestamp to an event stored in the log 128. In certain embodiments, the processor 124 may append the initiator timestamp to the most recent event in the log 128. Alternatively, the processor 124 may append the initiator timestamp to events in the log 128 associated with the initiating device 102. Also, the processor 124 may append the initiator timestamp to events in the log 128 that occur after the reception of the initiator timestamp. In another alternative, the processor 124 may append the initiator timestamp to events in the log 128 that have occurred since the reception of the last initiator timestamp.

In one or more embodiments, in response to receiving a timestamp report request, a receiving device may transmit a timestamp response. For example, after the receiving device 120 receives a timestamp report request from the initiating device 102, the processor 124 may acquire a receiver timestamp for the receiving device 120. Upon receiving the timestamp of the receiving device 120, processor 124 may create a timestamp response for responding to the initiating device 120, the timestamp response including the receiver timestamp. The processor 124 may then transmit the timestamp response to the initiating device 102 through the transceiver 122.

In certain embodiments, in response to receiving a timestamp response, a device in the network 100 may identify the timestamp from the transmitting device in the timestamp response and attach the timestamp to an associated entry in a record, such as a log, of the initiating device. For example, the initiating device 102 may receive a receiver timestamp response from the receiving device 120. As described above, the timestamp response sent from the receiving device 120 may include a receiver timestamp for the receiving device 120. Upon receiving the receiver timestamp response with the receiver timestamp, the processor 104 may extract the receiver timestamp from the timestamp response and append the receiver timestamp to a record of an event in the memory 126. For example, the processor 104 may append the receiver timestamp to an event stored in the log 108. In certain embodiments, the processor 104 may append the receiver timestamp to the most recent event in the log 108. Alternatively, the processor 104 may append the receiver timestamp to events in the log 108 associated with the receiving device 120. Also, the processor 104 may append the receiver timestamp to events in the log 108 that occur after the reception of the receiver timestamp. In another alternative, the processor 104 may append the receiver timestamp to events in the log 108 that have occurred since the reception of the last initiator timestamp.

In at least one embodiment, the initiating device may store a timestamp table 110 in the memory 106. As used herein, a timestamp table 110 may be a data structure that stores information regarding the differences between timestamps of different devices in the network 100. For example, the timestamp table 110 may store a difference between the timestamp of the initiating device 102 and the timestamp of the receiving device 120. Further, the timestamp table 110 may store a difference between the timestamp of the initiating device 102 and other devices on the network 100 such as receiving device 140 and receiving device 150. Further, a receiving device such as receiving device 120 may also store a timestamp table 130. The timestamp table 130 may be similar to the timestamp table 110. For example, the timestamp table 130 may store information regarding the differences between timestamps of devices in communication with the receiving device 120.

In a further embodiment, the network 100 may include devices that facilitate communications between multiple devices in a network 100. For example, to facilitate communication between multiple devices, the network 100 may include a switch 160, a router, or the like. As shown, a switch 160 may be communicatively coupled to the transceiver 112 of the initiating device 102 and to transceivers of receiving devices 140 and 150. In certain embodiments, the switch 160 may include a transceiver 162 that transmits and receives information with an initiating device 102. Also, the switch 160 may include a transceiver 166 that transmits and receives information with the receiving devices 140 and 150. In certain embodiments, the transceiver 166 includes multiple ports, where one port is coupled to the receiving device 140 and another port is coupled to the receiving device 150. When the transceiver 166 includes multiple ports, the switch 160 may include a switch, either mechanical or electrical, which may cause a signal to be transmitted to one of the receiving devices 140 and 150.

In certain embodiments, a switch may include a processor 164, where the processor 164 may be a microcontroller, processing unit, and the like. The processor 164 may control the destination of a signal to be transmitted to one of the receiving devices 140 and 150. Further, the processor 164 may provide a timestamp that may be appended to messages transmitted through the switch 160. While not shown in certain embodiments, the switch 160 may also include a memory such as memory 106, which memory 106 may include a log 128 and a timestamp table 130 which log 128 and timestamp table 130 may be similar to the log 108 and timestamp table 110. Accordingly, when the processor 164 appends a switch timestamp to messages that are transmitted through the switch 160, a receiving device 140 and 150 may attach the switch timestamp along with the initiator timestamp to records associated with the switch 160 or the initiating device 102 in communication with the receiving device 140 or 150.

As logs on the separate devices in the network 100 may maintain records that include timestamps associated with devices that communicate with one another, the timestamps stored in the separate logs and timestamp tables may be used to synchronize the data stored in the separate logs of the devices in network 100. As the associated data in the logs may be synchronized with one another, the data stored on the separate logs may aid in debugging or otherwise performing maintenance operations on the devices of the network 100.

Figure 2A:
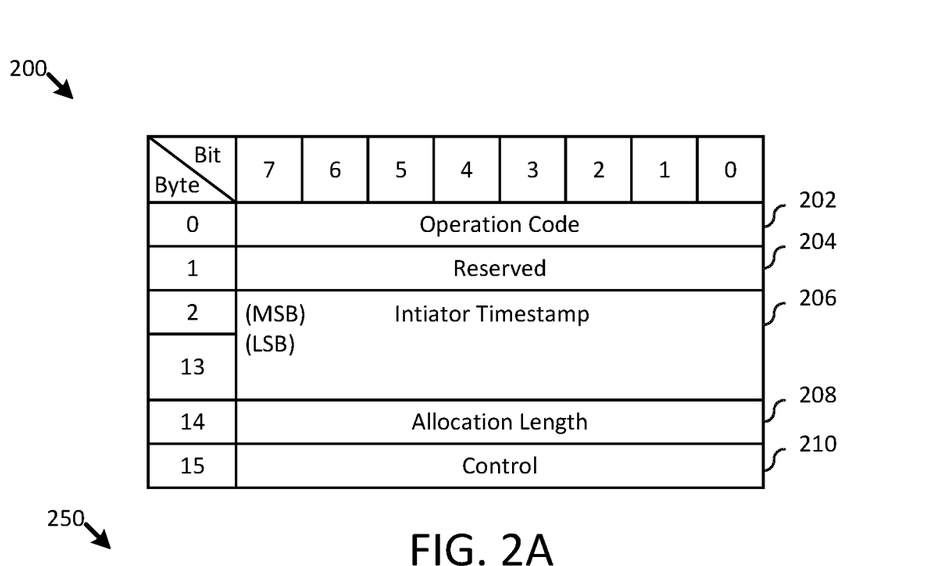
FIGS. 2A and 2B are diagrams illustrating embodiments of possible tables for transmitting timestamp report requests and timestamp responses.
Figure 2B:
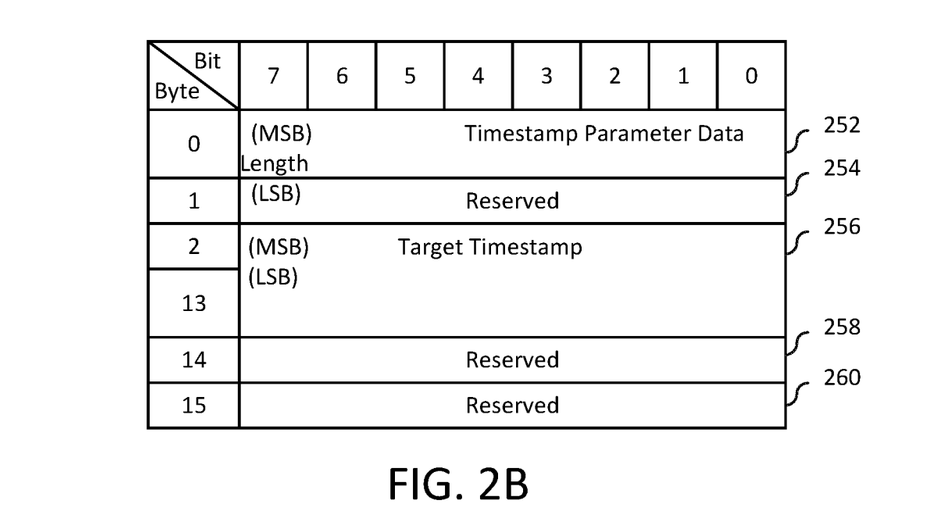

FIGS. 2A and 2B illustrate embodiments of possible tables for transmitting timestamp report requests and timestamp responses as described above in relation to FIG. 1. For example, FIG. 2A illustrates one embodiment of a possible table for transmitting a timestamp report request 200. As shown, the timestamp report request 200 is a command request from an initiating device to a target device requesting that the target device return the value of a timestamp for the target device. In at least one embodiment, the timestamp report request 200 may be communicated through a command descriptor block, wherein a command descriptor block may be a structure used by certain systems to communicate commands from an application client to a device server. In at least one implementation, command descriptor blocks may have a fixed length. Alternatively, in other implementations, a command descriptor block may have a variable length. As shown, the command request 200 may include a series of bytes that are allocated to impart particular information to a receiving device. For example, byte 0 of the timestamp report request 200 may be allocated for communicating an operation code 202. As described herein, an operation code 202 may identify the operation being requested by a command descriptor block. As the timestamp report request 200 is requesting that a receiving device report a timestamp, the operation code 202 may include information that identifies that the command descriptor block transmitted to the receiving device is a timestamp report request 200.

In certain embodiments, a byte may be reserved. When a length of data, such as a byte, is reserved, the length of data may be set aside for future standardization. In certain embodiments, the data in a field that is marked reserved may be set to zero values. Accordingly, when a length of data is reserved as indicated by the operation code 202, a receiving device may not have to decode the reserved fields for data. However, the receiving device may check to see if the reserved field has data stored other than zero values. If the reserve field has data stored therein, the receiving device may report an error for the message. As shown, in the timestamp report request 200, byte 204 may be reserved for future use in a future standard.

In at least one embodiment, the bytes 2-13 may be allocated for the communication of an initiator timestamp field 206. An initiating device may insert a timestamp associated with the initiating device into the initiator timestamp field 206 before transmitting the timestamp report request 200 to the receiving device. Upon reception of the timestamp report request 200, the receiving device may determine that a timestamp report request 200 has been received by the receiving device. When the receiving device determines that a timestamp report request 200 has been received, the receiving device may extract the initiator timestamp from bytes 2-13 of the timestamp report request. The receiving device may then use the extracted initiator timestamp to update information stored in logs on the receiving device that is associated with the initiating device.

In an additional embodiment, byte 14 may be an allocation length field 208. The allocation length field 208 may be a field that specifies a number of bytes that an initiating device has allocated in a data buffer to indicate how much data is to be transferred. Further, byte 15 may be a control field 210. The control field 210 may be a field that is used to control how the command is handled. For example, information in the control field 210 may be used to specify that the command is part of multiple commands, or other functionality. As described above, the information contained in a timestamp report request 200, as illustrated in FIG. 2A, may be able to request a timestamp from a receiving device while transmitting the timestamp of the initiating device to the receiving device.

FIG. 2B illustrates one embodiment of a possible table for transmitting a timestamp response 250. As shown, the timestamp response 250 is a response from a target device to a command request received from an initiating device that transmits a timestamp for the target device to the initiating device. In at least one embodiment, the timestamp report request 200 may be communicated through a response for transmitting parameter data. As shown, the command request 200 may include a series of bytes that are allocated to impart particular information to an initiating device. For example, bytes 0 of the timestamp response 250 may be allocated for a timestamp parameter data length field 252. As described herein, timestamp parameter data length field 252 may identify the length of the data contained in the report timestamp. For example, if the timestamp is transmitted through twelve bytes of data, the timestamp parameter data length field 252 may indicate that the timestamp response 250 may include twelve bytes of data. Further, bytes 2-13 of the timestamp response 250 may be allocated for a timestamp field 256, where the timestamp field 256 contains the transmitted timestamp for the receiving device. The initiating device may then extract the timestamp from the timestamp field 256. The reserved fields 254, 258, and 260 are allocated in a similar manner to reserved field 204 described above in relation to FIG. 2A.

FIG. 3 illustrates multiple embodiments of log entries for a receiving device and an initiating device. For example, FIG. 3 illustrates a first log entry 302 (first receiver record) and a second log entry 304 (second receiver record) for a receiving device, and an initiator log entry 306 or initiator record 306. The first log entry 302 illustrates a log entry or receiver record that may be found on a receiving device, where the receiving device has not received an initiator timestamp. A log entry or receiver record may be a record of computational activities performed by the receiving device. For example, the first log entry 302 may include the timestamp November 3 19:26:54 for the localhost. Accordingly, it may be difficult to perform debugging operations when information found in a log entry has only a timestamp for the localhost and the timestamp on the localhost is different from the timestamp on a remote-host associated with the information.

In contrast to the first log entry 302, a second log entry 304 illustrates a log entry that may be found on a receiving device, where the receiving device has received an initiator timestamp through a timestamp report request such as the timestamp report request 200 described above with respect to FIG. 2. Accordingly, a processor on the receiving device may extract the initiator timestamp from the timestamp report request and append the initiator timestamp to entries in a log stored on the receiving device. For example, the second log entry 304 may include separate timestamps for the remote-host and the localhost. As shown, the second log entry 304 may include an initiator timestamp of November 3 15:26:12 associated with the remote-host and the second log entry 304 may include a receiver timestamp of November 3 19:26:54 associated with the localhost. Accordingly, by having both the receiver timestamp and the initiator timestamp associated with an entry, debugging operations may be facilitated when debugging communications and related operations involving both the initiating device and the receiving device.

In certain embodiments, an initiator log entry or initiator record, such as initiator log entry 306, may include both a timestamp for a localhost and a timestamp for a remote-host. As used herein, an initiator record may be record of computational activities performed by an initiating device. In at least one example, where the timestamp for a computational activity is record in the initiator record, the timestamp for the localhost may be 11/03/2016 15:26:12. Also, the timestamp for the remote-host may be 11/03/2016 19:26:54, which timestamps are similar to the timestamps described above with relation to second log entry 304. In certain embodiments, for the initiating device to receive the timestamp for the receiving device, the initiating device may receive a timestamp response, where the timestamp response is substantially similar to the timestamp response 250 discussed above with respect to FIG. 2B. The initiating device may extract the timestamp found in the timestamp response received from the receiving device and append the timestamp found in the timestamp response to entries in the initiator log associated with the receiving device. Accordingly, by having both the receiver timestamp and the initiator timestamp associated with an entry, debugging operations may be facilitated when debugging communications and related operations involving the initiating device and/or the receiving device.

Figure 4:
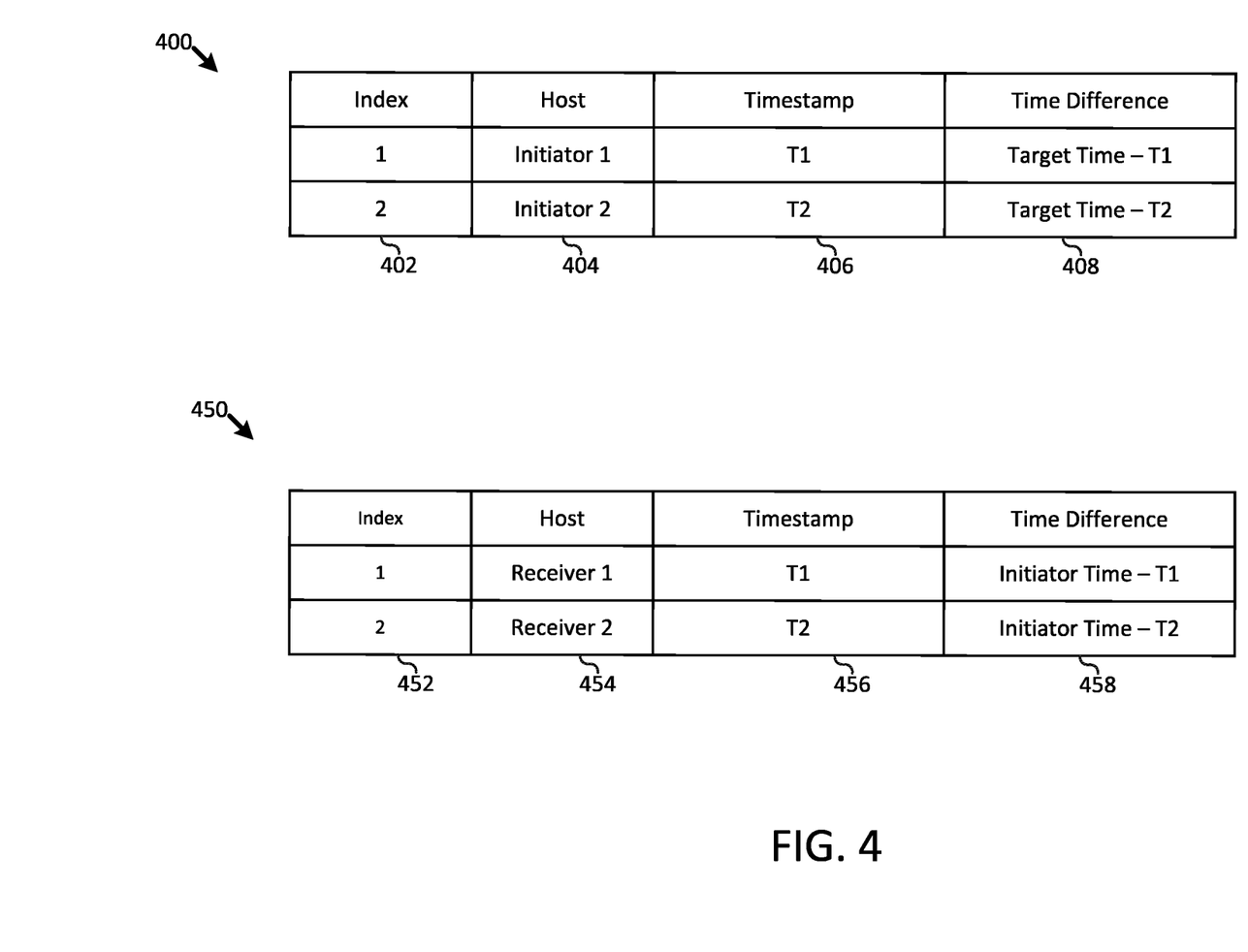
FIG. 4 is a block diagram illustrating embodiments of timestamp tables stored on a host device and a target device.

In certain embodiments, a device in a network may maintain a timestamp table. For example, as described above, initiating device 102 and receiving device 120 may respectively maintain a timestamp table 110 and a timestamp table 130. FIG. 4 illustrates at least one embodiment for a receiver timestamp table 400 and an initiator timestamp table 450. As illustrated, a timestamp table may be a record of differences between the timestamp of a device and the timestamps of other devices in communication with the device. As shown, the receiver timestamp table 400 maintains a record of timestamp differences by cataloguing different initiating devices by an index 402, a host name 404, a timestamp 406, and a time difference 408. In a similar manner, the initiator timestamp table 450 maintains a record of timestamp differences by cataloguing different receiving devices by an index 452, a host name 454, a timestamp 456, and a time difference 458.

As illustrated in receiver timestamp table 400, the receiving device that maintains receiver timestamp table 400 may be in communication with two separate initiating devices. For example, the receiving device may be in communication with an initiator 1 and an initiator 2, where information associated with initiator 1 may be indexed first and information associated with initiator 2 may be indexed second in the index 402. As shown, the names of the separate initiating devices may be stored in host name 404. When the receiving device that maintains the receiver timestamp table 400 receives a timestamp report request from an initiating device, the receiving device may extract the timestamp from a timestamp report request received from the initiating device and store it in the timestamp table in the timestamp column 406 associated with the index of the initiating device. After extracting the timestamp from the timestamp report request, the receiving device may calculate a time difference between the timestamp of the receiving device and the extracted timestamp from the timestamp report request.

As illustrated in initiator timestamp table 450, the initiating device that maintains initiator timestamp table 450 may be in communication with two separate receiving devices. For example, the initiating device may be in communication with a receiver 1 and a receiver 2, where information associated with receiver 1 may be indexed first and information associated with receiver 2 may be indexed second in the index 452. As shown, the names of the separate receiving devices may be stored in host name 454. When the initiating device that maintains the initiator timestamp table 450 receives a timestamp response from a receiving device, the initiating device may extract the timestamp from a timestamp response received from the receiving device and store it in the timestamp table in the timestamp column 456 associated with the index of the receiving device. After extracting the timestamp from the timestamp response, the initiating device may calculate a time difference between the timestamp of the initiating device and the extracting timestamp from the timestamp response.

Figure 5:
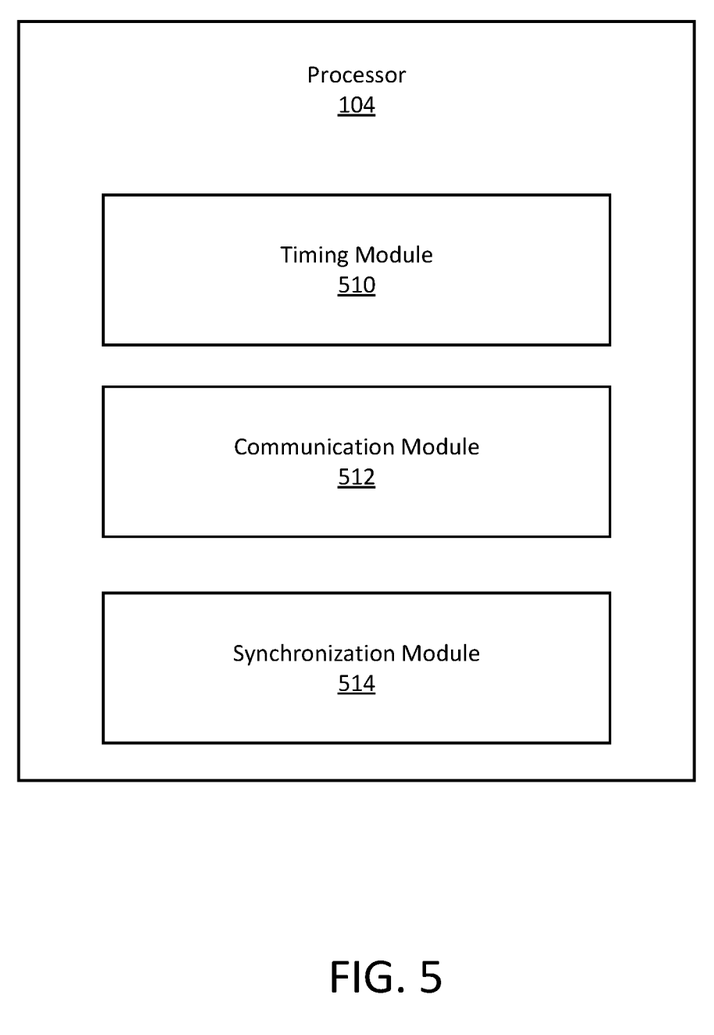
FIG. 5 is a block diagram illustrating one embodiment of a processor configured to synchronize timestamps in target device and host device logs.

FIG. 5 illustrates an embodiment of a processor 104. The processor 104, in various embodiments, may be substantially similar to the processor 104 described above with regards to FIGS. 1 through 4. Further, the processor 104, in various embodiments, may also be substantially similar to the processor 124 described above with regards to FIG. 1. In the depicted embodiment, the processor 104 includes a tiny module 510, a communication module 512, and a synchronization module 514. As described herein, the timing module 510 may acquire an initiator timestamp, wherein the initiator timestamp indicates the time on an initiating device associated with a computational activity performed between the initiating device and a receiving device. As described herein, a computational activity may be an action performed by a computation device such as the processing of data, transmission/reception of data, storing of data, and the like. Further, as described herein, the communication module 512 may transmit an initiator timestamp to a receiving device. Also, as described herein, the synchronization module 514 may associate a receiver record of a computational activity on a receiving device with an initiator timestamp.

In certain embodiments, the timing module 510 is configured to acquire an initiator timestamp, wherein the initiator timestamp indicates a time on an initiating device associated with the computational activity performed between an initiating device and a receiving device. As described herein, when a computational activity is performed, a timing module 510 may identify a time for the performance of activity. In certain embodiments, an activity may be performed between one or more devices. For example, a message may be transmitted from one device to another device. The timing module 510 may identify a time associated with the computational activity performed between the one or more devices. When the identified time is identified on an initiating device, the time identified by the timing module 510 may be an initiator timestamp. Alternatively, when the identified time is identified on a receiving device, the time identified by the timing module may be a receiver timestamp.

When a timestamp is identified for an initiating device, a communication module 512 may transmit the initiator timestamp to a receiving device. As described above, a communication module 512 may transmit an initiator timestamp to a receiving device by embedding the initiator timestamp in a timestamp report request command, where the timestamp report request command is a command sent to a receiving device that requests that the receiving device sent its timestamp back to the initiating device. As described herein, an initiating device may be the device that is sending the timestamp report request command. For example, a host may be functioning as an initiating device when the host sends a timestamp report request command to a client device. Also, a client device may be functioning as an initiating device when the client device sends a timestamp report request command to a host. Alternatively, an initiating device may merely transmit an initiator timestamp directly to the receiving device without requesting the receiving device to transmit a timestamp for the receiving device to the initiating device. In such a way, an initiating device may transmit a timestamp to a receiving device.

In certain embodiments, when a receiving device receives an initiator timestamp from an initiating device, a synchronization module 514 may associate a receiver record of a computational activity on the receiving device with initiator timestamp. For example, upon receiving the timestamp report request command with the initiator timestamp, the synchronization module 514 may extract the initiator timestamp from the timestamp report request command and append the initiator timestamp to a record of a computational activity. For example, the synchronization module 514 may append the initiator timestamp to an event stored in a log of computational activities. In certain embodiments, the synchronization module 514 may append the initiator timestamp to the most recently recorded computational activity. Alternatively, the synchronization module 514 may append the initiator timestamp to recorded computational activities associated with the initiating device. Also, the synchronization module 514 may append the initiator timestamp to recorded computational activities that occur after the reception of the initiator timestamp. In another alternative, the synchronization module 514 may append the initiator timestamp to recorded computational activities that have occurred since the reception of the last initiator timestamp from the initiating device.

In a further embodiment, the timing module 510 may also acquire a receiver timestamp associated with a computational activity. In certain embodiments, after receiving a timestamp report request command from an initiating device, a timing module 510 may identify a timestamp for the receiving device. When the timing module 510 acquires a receiver timestamp in response to the timestamp report request command, the communication module 512 may transmit the receiver timestamp to the initiating device. In at least one embodiment, the communication module 512 may transmit the receiver timestamp to the initiating device through a timestamp response. Upon reception of the receiver timestamp, the synchronization module 514 may extract the receiver timestamp from the timestamp response and append the receiver timestamp to recorded computational activities associated with the receiving device on the initiating device.

Figure 6:
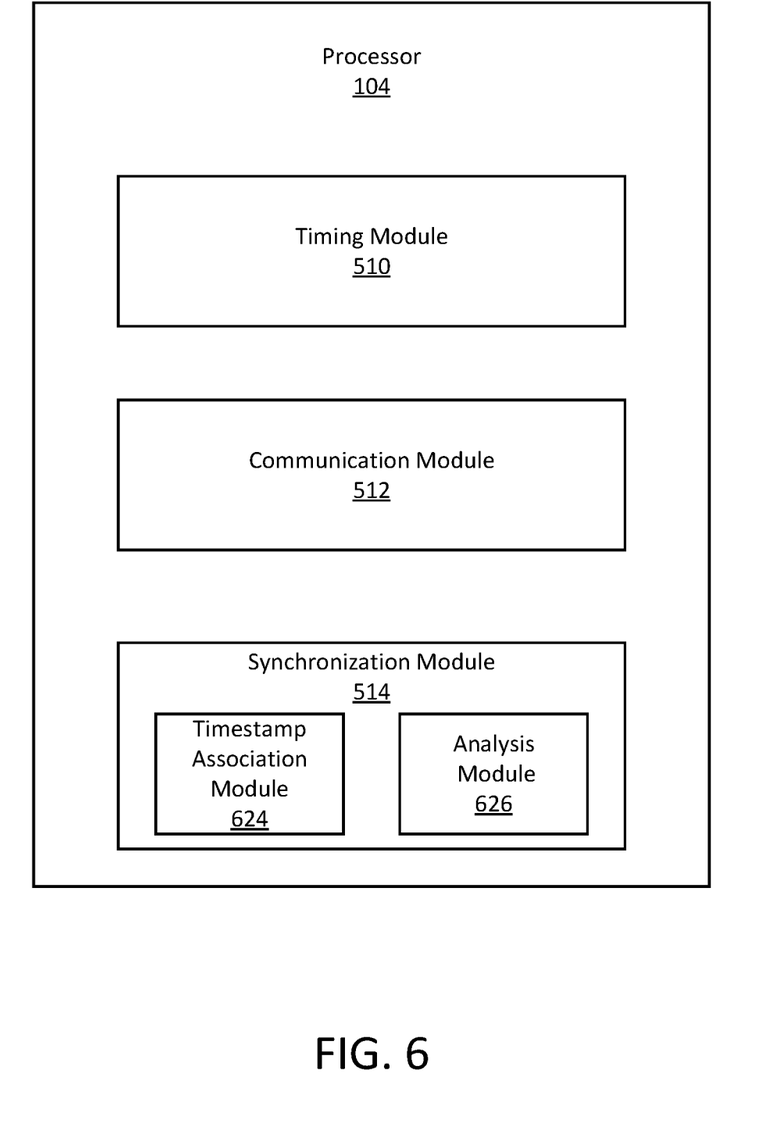
FIG. 6 is block diagram illustrating a further embodiment of a processor configured to synchronize timestamps in target device and host device logs.

FIG. 6 depicts another embodiment of a processor 104. Processor 104, in various embodiments, may be substantially similar to the processor 104 described above with regards to FIGS. 1 through 4. In the depicted embodiment, the processor 104 may include a timing module 510, a communication module 512, and a synchronization module 514, which may be configured substantially similar as described above with regards to the monitor module 510, the communication module 512, and the synchronization module 504 described above with respect to FIGS. 1 through 4. Additionally, the synchronization module 514 may include a timestamp association module 624 and an analysis module 626.

The timestamp association module 624, in one embodiment, is configured to associate timestamps with computational activities performed by one or more of the initiating device and the receiving device. In certain embodiments, when a communication module 512 receives a message with a timestamp, the timestamp association module 624 may associate the timestamp and the device that transmitted the timestamp with a computational activity stored in a record on the receiving device. For example, when a receiving device receives an initiator timestamp from the initiating device, the timestamp association module 624 may identify computational activities stored in a record on the receiving device that are associated with the initiating device. After identifying the computational activities associated with the initiating device, the timestamp association module 624 may then associate the computational activities associated with the initiating device with the initiator timestamp. Also, when an initiating device receives a receiver timestamp from the receiving device, the timestamp association module 624 may identify computational activities stored in a record on the initiating device that are associated with the receiving device. After identifying the computational activities associated with the receiving device, the timestamp association module 624 may then associate the computational activities associated with the receiving device with the receiver timestamp.

The analysis module 626, in one embodiment, is configured to maintain a timestamp table on a device, where a timestamp table indicates the difference between a timestamp from another device and a timestamp produced by the device. For example, a receiving device may maintain a timestamp table that shows the difference between timestamps received from initiator devices to the receiving device and the timestamp for the receiving device. To calculate the difference between a received initiator timestamp and the timestamp of the receiving device, the analysis module 626 may find the difference between an initiator timestamp received in a timestamp report request and a timestamp response that is transmitted in response to the timestamp report request. Conversely an initiating device may maintain a timestamp table that shows the difference between timestamps received from receiving devices to the initiating device and a timestamp for the initiator device. To catch the difference between a received receiving timestamp and the timestamp of the initiating device, the analysis module 626 may find the difference between an initiator timestamp transmitted as part of a timestamp report request and a receiving timestamp received in a timestamp response that was transmitted from a receiving device in response to the timestamp report request.

Figure 7:
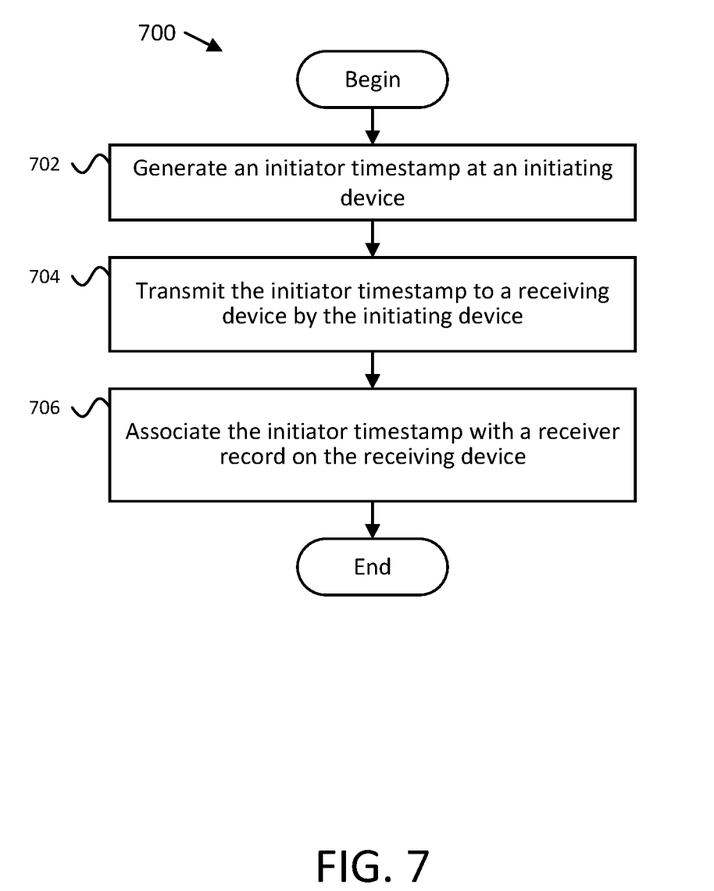
FIG. 7 is a flowchart diagram illustrating one embodiment of a method for synchronizing timestamps in target device and host device logs.

FIG. 7 depicts one embodiment of a method 700 for synchronization of host and client log timestamps. In certain embodiments the method 700 begins at 702, where an initiator timestamp is generated at an initiating device. The method 700 proceeds at 704, where the initiator timestamp is transmitted to a receiving device by the initiating device. For example, the initiating device may embed the initiator timestamp in a request for the receiving device to transmit a timestamp for the receiving device.

Further, the method 700 proceeds at 706 where the initiator timestamp is associated with the receiver record on the receiving device. For example, the receiving device may maintain records of computational activities, such as logs. When a timestamp is received at the receiving device from the initiating device, the receiving device may associate records of computational activities involving the initiating device with the timestamp received from the initiating device. Conversely, when a timestamp is received at the initiating device from the receiving device, the initiating device may associate records of computational activities involving the receiving device with the timestamp received from the receiving device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
a timing module that acquires an initiator timestamp that is included in a timestamp request received from an initiating device, wherein:
the initiator timestamp is included in an initiator record of a previously completed computational transaction between an initiating device and the receiving device,
the initiator record is stored on the initiating device, and
the initiator timestamp includes an indication of a first time that the initiating device and the receiving device performed the previously completed computational transaction from an initiating device perspective;

a communication module that:
transmits the initiator timestamp to the receiving device in response to receiving the initiator timestamp, and
transmits a receiver timestamp for the previously completed computational transaction to the initiating device in response to receiving the timestamp request; and
a synchronization module that:
receives the initiator timestamp, and
appends the initiator timestamp to a receiver record of the previously completed computational transaction stored on the receiving device,
wherein:
the receiver record of the previously completed computational transaction includes the receiver timestamp,
the receiver timestamp includes an indication of a second time that the initiating device and the receiving device performed the previously completed computational transaction from a receiving device perspective, and
the receiver record including the receiver timestamp and the appended initiator timestamp is utilized to facilitate one of debugging operations and system maintenance operations.

2. The system of claim 1, wherein:
the timing module acquires the receiver timestamp associated with the previously completed computational transaction.

3. The system of claim 2, wherein the communication module is further configured to transmit the receiver timestamp to the initiating device.

4. The system of claim 2, wherein the synchronization module is further configured to append the receiver timestamp to the initiator record of the previously completed computational transaction on the initiating device.

5. The system of claim 1, wherein the communication module is further configured to generate a command to transmit the initiator timestamp to the receiving device.

6. The system of claim 1, wherein:
the communication module is further configured to insert the initiator timestamp into a timestamp report request; and
the timestamp report request is a request to the receiving device to provide a timestamp report.

7. The system of claim 1, wherein:
the communication module is further configured to transmit the initiator timestamp to a switch; and
the switch is configured to relay the initiator timestamp to the receiving device.

8. The system of claim 7, wherein:
the switch is further configured to append a switch timestamp for the previously completed computational transaction to the initiator timestamp; and
the synchronization module is further configured to append the switch timestamp to the receiver record of the previously completed computational transaction.

9. The system of claim 1, further comprising:
an analysis module, wherein:
the analysis module is configured to maintain a timestamp table on the receiving device, and
the timestamp table is configured to indicate a first difference between the initiator timestamp and the second time.

10. The system of claim 9, wherein:
the timestamp table is further configured to indicate a second difference between a second initiator timestamp and a third time on the receiving device;
the second initiator timestamp is transmitted to the receiving device from a second initiating device;
the second initiator timestamp includes an indication of a fourth time that the second initiating device and the receiving device performed a second previously completed computational transaction from a second initiating device perspective; and
a second receiver record of the second previously completed computational transaction includes a second receiver timestamp that includes an indication of the third time that the second initiating device and the receiving device performed the second previously completed computational transaction from a second receiving device perspective.

11. A method, comprising:
generating an initiator timestamp at an initiating device, wherein the initiator timestamp includes an indication of a first time that the initiating device and a receiving device performed a previously completed computational transaction from an initiating device perspective;
transmitting, by the initiating device, the initiator timestamp to the receiving device via a timestamp request;
appending the initiator timestamp with a receiver record of the previously completed computational transaction on the receiving device; and
transmitting a receiver timestamp for the previously completed computational transaction to the initiating device in response to receiving the timestamp request,
wherein:
the receiver record of the previously completed computational transaction includes the receiver timestamp that includes an indication of a second time that the initiating device and the receiving device performed the previously presented computational transaction from a receiving device perspective, and
the receiver record including the receiver timestamp and the appended initiator timestamp is utilized to facilitate one of debugging operations and system maintenance operations.

12. The method of claim 11, wherein transmitting the initiator timestamp comprises transmitting a timestamp report request to the receiving device.

13. The method of claim 12, wherein transmitting the timestamp report request comprises inserting the initiator timestamp into a SCSI report timestamp command.

14. The method of claim 12, wherein transmitting the timestamp report request comprises relaying the timestamp report request through a switch.

15. The method of claim 14, further comprising inserting a switch timestamp into the timestamp report request.

16. The method of claim 11, further comprising:
updating a timestamp table on the receiving device,
wherein the timestamp table is configured to indicate a first difference between the initiator timestamp and the second time.

17. The method of claim 16, wherein:
the timestamp table is further configured to indicate a second difference between a second initiator timestamp and a third time on the receiving device;
the second initiator timestamp is transmitted to the receiving device from a second initiating device;
the second initiator timestamp includes an indication of a fourth time that the second initiating device and the receiving device performed a second previously completed computational transaction from a second initiating device perspective; and
a second receiver record of the second previously completed computational transaction includes a second receiver timestamp that includes an indication of the third time that the second initiating device and the receiving device performed the second previously completed computational transaction from a second receiving device perspective.

18. A computer program product comprising a computer-readable storage medium including program instructions embodied therewith, the program instructions executable by a processor to cause the processor to:
generate an initiator timestamp at an initiating device, wherein the initiator timestamp includes an indication of a first time that the initiating device and a receiving device performed a previously completed computational transaction from an initiating device perspective;
transmit, by the initiating device, the initiator timestamp to the receiving device via a timestamp request;
append the initiator timestamp with a receiver record of the previously completed computational transaction on the receiver device; and
transmit a receiver timestamp for the previously completed computational transaction to the initiating device in response to receiving the timestamp request,
wherein:
the receiver record of the previously completed computational transaction includes a receiver timestamp that includes an indication of a second time that the initiating device and the receiving device performed the previously completed computational transaction from a receiving device perspective, and
the receiver record includes the receiver timestamp and the appended initiator timestamp is utilized to facilitate one of debugging operations and system maintenance operations.

19. The computer program product of claim 18, wherein the program instructions further cause the processor to insert the initiator timestamp into a SCSI report timestamp command.

20. The computer program product of claim 18, wherein:
the program instructions further cause the processor to update a timestamp table on the receiving device; and
the timestamp table is further configured to indicate a difference between the initiator timestamp and the second time.

* * * * *